United States Patent
Austin et al.

(10) Patent No.: US 10,022,756 B2
(45) Date of Patent: Jul. 17, 2018

(54) METHOD AND SYSTEM FOR RECOVERING AND DISPLACING FLUID FROM A PIPE

(71) Applicant: AMEC FOSTER WHEELER USA CORPORATION, Houston, TX (US)

(72) Inventors: John A. Austin, Katy, TX (US); Raymond Christopher Young, Houston, TX (US)

(73) Assignee: AMEC FOSTER WHEELER USA CORPORATION, Houston, TX (US)

( * ) Notice: Subject to any disclaimer, the term of this patent is extended or adjusted under 35 U.S.C. 154(b) by 0 days.

(21) Appl. No.: 15/274,831

(22) Filed: Sep. 23, 2016

(65) Prior Publication Data

US 2017/0008043 A1    Jan. 12, 2017

Related U.S. Application Data

(63) Continuation of application No. 13/837,481, filed on Mar. 15, 2013, now Pat. No. 9,534,479, which is a
(Continued)

(51) Int. Cl.
*B08B 9/032* (2006.01)
*F16L 1/16* (2006.01)
(Continued)

(52) U.S. Cl.
CPC ........... *B08B 9/0321* (2013.01); *B08B 9/027* (2013.01); *B08B 9/032* (2013.01); *B08B 9/055* (2013.01); *B08B 9/0553* (2013.01); *B08B 9/0555* (2013.01); *E21B 31/12* (2013.01); *E21B 43/01* (2013.01); *E21B 43/12* (2013.01); *F16L 1/166* (2013.01); *F16L 55/38* (2013.01); *B08B 1/00* (2013.01); *B08B 1/005* (2013.01); *B08B 3/00* (2013.01); *B08B 3/04* (2013.01);
(Continued)

(58) Field of Classification Search
CPC .......... E21B 43/12; E21B 43/01; E21B 31/12; B08B 9/0321; B08B 9/032; B08B 9/055; B08B 9/0553; B08B 9/0555; B08B 9/027; B08B 1/00; B08B 5/00; B08B 3/00; B08B 3/04; B08B 1/005; B08B 9/00; B08B 9/04; F16L 1/166; F16L 55/38; Y10T 137/85978; Y10T 137/8593
See application file for complete search history.

(56) References Cited

U.S. PATENT DOCUMENTS

| 2,324,886 A | 7/1943 | Sowders |
| 3,543,323 A | 12/1970 | Girard |

(Continued)

OTHER PUBLICATIONS

Thomas, Shane, "International Search Report" prepared for PCT/US2013/057004 dated Jan. 29, 2014, 3 pages.
(Continued)

*Primary Examiner* — Michael Barr
*Assistant Examiner* — Benjamin L Osterhout
(74) *Attorney, Agent, or Firm* — Winstead PC

(57) ABSTRACT

In one aspect, the present invention relates to a method for displacing fluid from a pipe. The method includes engaging a fluid-displacement system with the pipe. A displacement agent is pumped into the pipe via the fluid-displacement system. Fluid present within the pipe is displaced by the displacement agent. The pipe is manipulated in a desired manner.

8 Claims, 12 Drawing Sheets

Related U.S. Application Data continuation-in-part of application No. 13/597,547, filed on Aug. 29, 2012, now Pat. No. 9,255,458.

(60) Provisional application No. 61/528,511, filed on Aug. 29, 2011, provisional application No. 61/694,529, filed on Aug. 29, 2012.

(51) Int. Cl.

| | | |
|---|---|---|
| *F16L 55/38* | (2006.01) | |
| *E21B 43/01* | (2006.01) | |
| *E21B 31/12* | (2006.01) | |
| *B08B 9/027* | (2006.01) | |
| *E21B 43/12* | (2006.01) | |
| *B08B 9/055* | (2006.01) | |
| *B08B 1/00* | (2006.01) | |
| *B08B 5/00* | (2006.01) | |
| *B08B 3/00* | (2006.01) | |
| *B08B 3/04* | (2006.01) | |
| *B08B 9/00* | (2006.01) | |
| *B08B 9/04* | (2006.01) | |

(52) U.S. Cl.
CPC . *B08B 5/00* (2013.01); *B08B 9/00* (2013.01); *B08B 9/04* (2013.01); *Y10T 137/8593* (2015.04); *Y10T 137/85978* (2015.04)

(56) References Cited

U.S. PATENT DOCUMENTS

| | | | |
|---|---|---|---|
| 3,685,083 A | 8/1972 | Jones | |
| 3,751,932 A | 8/1973 | Matthews, Jr. | |
| 3,788,084 A | 1/1974 | Matthews, Jr. | |
| 3,879,790 A * | 4/1975 | Girard | B08B 9/0553 15/104.061 |
| 4,004,635 A | 1/1977 | Marquaire et al. | |
| 4,016,620 A * | 4/1977 | Powers | B08B 9/0553 15/104.061 |
| 4,142,739 A | 3/1979 | Billingsley | |
| 4,218,158 A | 8/1980 | Tesson | |
| 4,249,810 A * | 2/1981 | O'Connor | G03B 37/005 346/33 P |
| 4,389,461 A | 6/1983 | Scott | |
| 4,509,222 A * | 4/1985 | Knapp | B08B 9/0553 15/104.061 |
| 4,543,131 A | 9/1985 | Purinton, Jr. | |
| 4,662,785 A | 5/1987 | Gibb et al. | |
| 5,105,888 A | 4/1992 | Pollock et al. | |
| 5,188,483 A | 2/1993 | Kopp et al. | |
| 5,868,203 A | 2/1999 | Cunningham | |
| 6,070,285 A * | 6/2000 | Geppert | B08B 9/0553 15/104.05 |
| 6,196,757 B1 | 3/2001 | Bakke | |
| 6,371,207 B1 | 4/2002 | Reynolds | |
| 6,527,869 B1 | 3/2003 | Bourg | |
| 2002/0100590 A1* | 8/2002 | De Almeida | F16L 55/46 166/339 |
| 2004/0234776 A1* | 11/2004 | Corbett, Jr. | C09D 175/04 428/423.1 |
| 2007/0161339 A1* | 7/2007 | Wentworth | B24B 5/40 451/51 |
| 2008/0245528 A1 | 10/2008 | Stokka et al. | |
| 2009/0307857 A1 | 12/2009 | Hestenes | |
| 2010/0012151 A1 | 1/2010 | Baugh et al. | |
| 2010/0089126 A1 | 4/2010 | Sweeney | |
| 2010/0170535 A1 | 7/2010 | Freeman et al. | |
| 2011/0120499 A1* | 5/2011 | Pruett | B08B 9/055 134/22.12 |
| 2013/0049385 A1 | 2/2013 | Austin et al. | |
| 2013/0199651 A1 | 8/2013 | Bowie | |
| 2014/0060678 A1 | 3/2014 | Austin et al. | |

OTHER PUBLICATIONS

Copenheaver, Blaine R., "International Search Report" prepared for PCT/US2012/052778 dated Nov. 13, 2012, 2 pages.

* cited by examiner

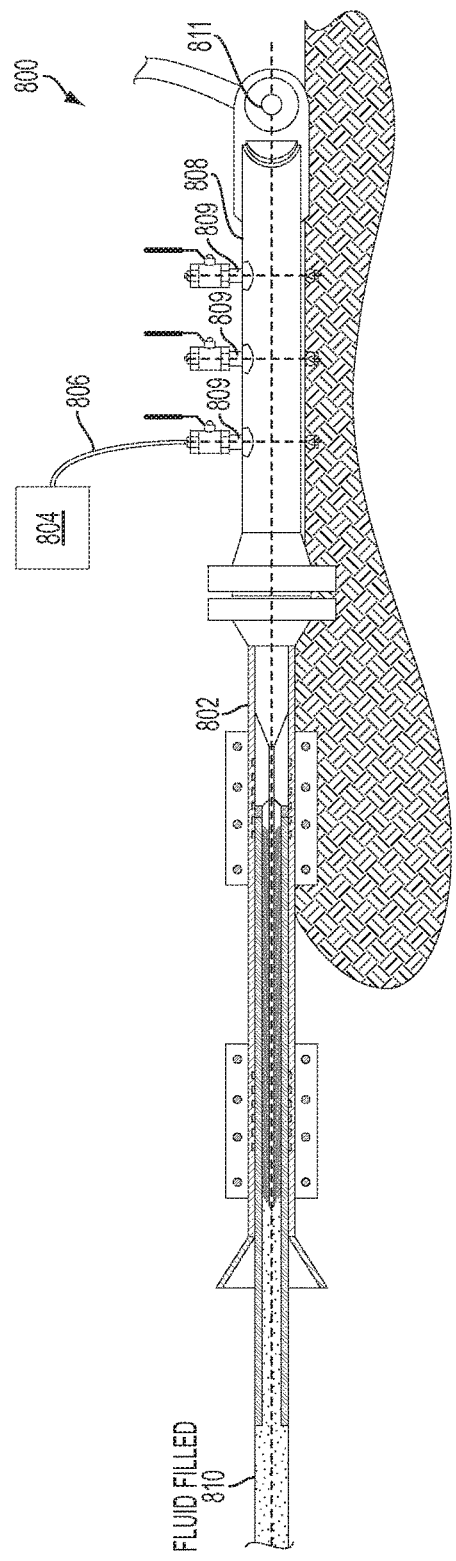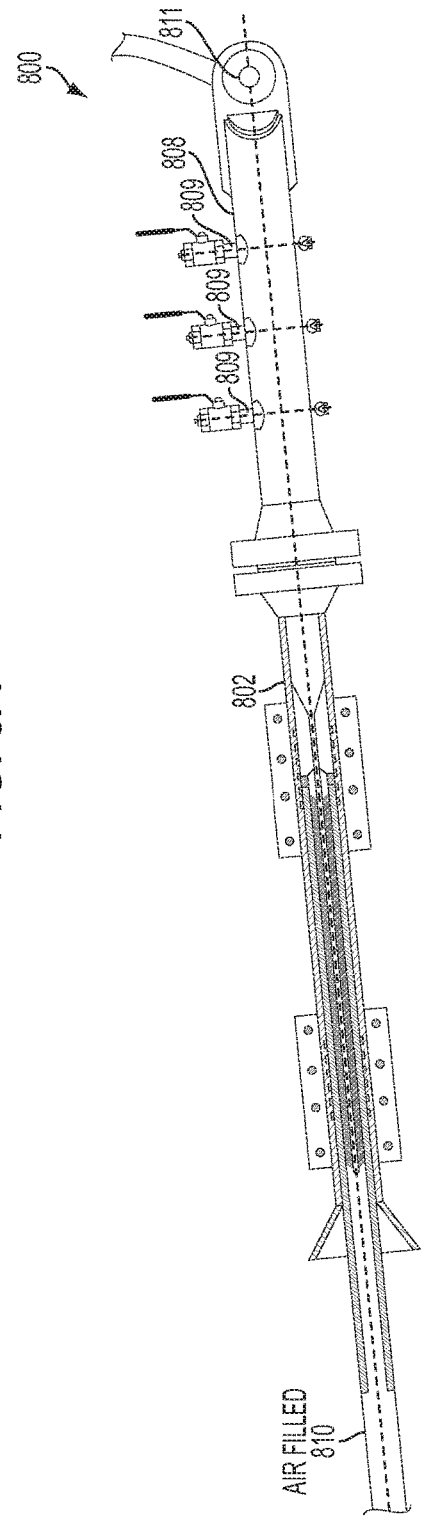
FIG. 8A
FIG. 8B

METHOD AND SYSTEM FOR RECOVERING AND DISPLACING FLUID FROM A PIPE

CROSS-REFERENCE TO RELATED APPLICATIONS

This application is a continuation of U.S. patent application Ser. No. 13/837,481, filed on Mar. 15, 2013. U.S. patent application Ser. No. 13/837,481 claims priority to U.S. Provisional Patent Application No. 61/694,529, filed Aug. 29, 2012. U.S. patent application Ser. No. 13/837,481 is a continuation-in-part of U.S. patent application Ser. No. 13/597,547, filed on Aug. 29, 2012. U.S. patent application Ser. No. 13/597,547 claims priority to U.S. Provisional Patent Application No. 61/528,511, filed on Aug. 29, 2011. U.S. patent application Ser. No. 13/837,481; U.S. Provisional Patent Application No. 61/694,529; U.S. patent application Ser. No. 13/597,547; and U.S. Patent Application Publication No. 61/528,511 are incorporated herein by reference.

BACKGROUND

Field of the Invention

The present invention relates to systems and methods for recovering and displacing fluid from a pipe and more particularly, but not by way of limitation, to systems and methods for recovering and displacing fluid from pipe associated with an offshore petroleum well via an interference engagement with the pipe.

History of the Related Art

The discovery, development, and production of petroleum wells that lie underwater, known as offshore petroleum production, has become increasingly significant. Offshore petroleum production allows access to deposits of, for example, oil and gas that might otherwise be unreachable through conventional land-based petroleum production. Offshore petroleum production is considerably more challenging than land-based petroleum production due to harsh environmental conditions. For example, an ocean depth often increases a length of a fluid column associated with an offshore well by several hundred meters. The longer fluid column increases downhole pressures associated with the offshore well and substantially increases a magnitude of energy required to lift produced fluids from an ocean floor to a drilling platform.

During offshore petroleum production, sections of pipe are frequently lost on the ocean floor. Sections of lost pipe are frequently unrecoverable using conventional techniques and, thus, represent a significant loss to a company engaged in offshore exploration. In addition, pipelines and flowlines, for transporting petroleum products may become damaged due to, for example, dragging an anchor of an ocean vessel over the pipeline or flowline. In this situation, sections of damaged or otherwise abandoned pipeline or flowline will need to be recovered. During recovery of damaged or abandoned pipe, flooding of the pipe with water or petroleum products adds considerable weight to the pipe and significantly increases a magnitude of energy required to lift the pipe. Thus, effective displacement of fluid becomes crucial to the recovery of pipe and pipeline components.

SUMMARY

The present invention relates to systems and methods for recovering and displacing fluid from a pipe and more particularly, but not by way of limitation, to systems and methods for recovering and displacing fluid from pipe associated with an offshore petroleum well via an interference engagement with the pipe. In one aspect, the present invention relates to a method for displacing fluid from a pipe. The method includes engaging a fluid-displacement system with the pipe. A displacement agent is pumped into the pipe via the fluid-displacement system. Fluid present within the pipe is displaced by the displacement agent. The pipe is manipulated in a desired manner.

In another aspect, the present invention relates to a system. The system includes a displacement-agent source containing a displacement agent. A friction-pin unit is operatively coupled, via a conduit, to the displacement-agent source to allow transmission of the displacement agent from the displacement-agent source to the friction-pin unit. The friction-pin unit includes a sleeve, a guide cone formed at a first end of the sleeve, a shaft disposed coaxially within the sleeve, and a plurality of friction pins extending radially outward from the shaft.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A more complete understanding of the method and system of the present invention may be obtained by reference to the following Detailed Description when taken in conjunction with the accompanying drawings wherein:

FIG. 8A-8B are schematic diagrams of a pipe fluid-displacement system;

DETAILED DESCRIPTION

Figure 1:
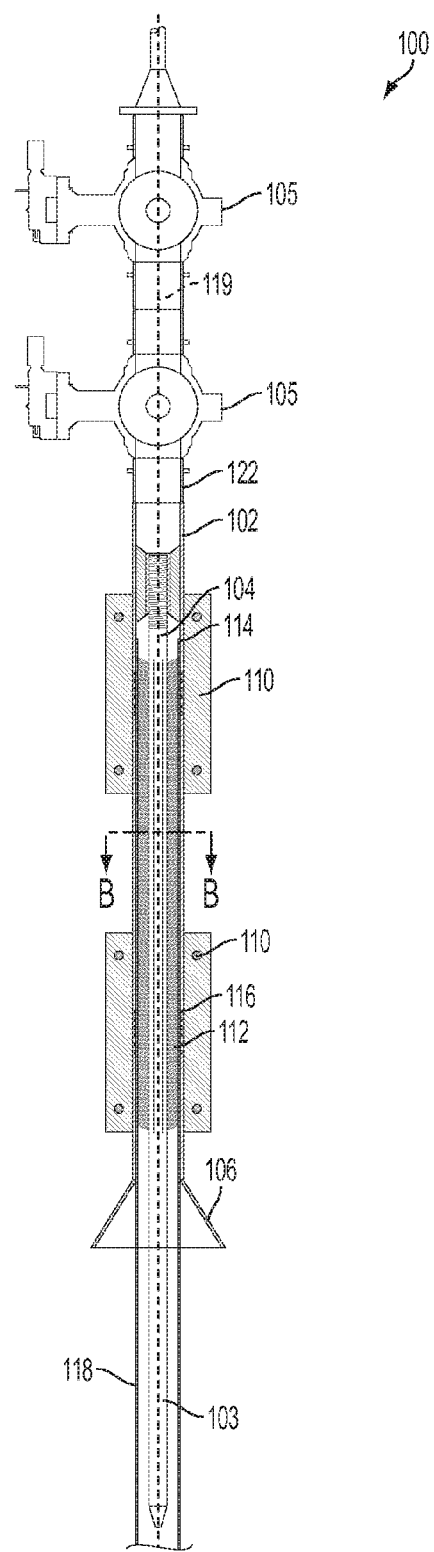
FIG. 1 is a side cross-sectional view of a friction-pin unit.

Various embodiments of the present invention will now be described more fully with reference to the accompanying drawings Like reference numerals are utilized to reference like components. The invention may, however, be embodied in many different forms and should not be construed as limited to the embodiments set forth herein.

FIG. 1 is a side cross-sectional view of a friction-pin unit 100. The friction-pin unit 100 includes a sleeve 102 having a vertical axis 119. In a typical embodiment, the sleeve 102 has an inner diameter that is slightly larger than an outer diameter of a pipe 118, such as, for example, a damaged sub-sea riser pipe. In a typical embodiment, a slip-fit engagement is present between the sleeve 102 and the pipe 118. A guide cone 106 is formed on a bottom aspect of the sleeve 102. In a typical embodiment, the guide cone 106 is integrally formed with the sleeve 102; however, in other embodiments, the guide cone 106 may be joined to the sleeve 102 through a process such as, for example, welding. A stop ring 114 and at least one ring seal 116 are circumferentially disposed about an interior surface of the sleeve 102. In a typical embodiment, the stop ring 114 is disposed near a top end 122 of the sleeve 102 and the at least one ring seal 116 is disposed below the stop ring 114 relative to the sleeve 102. A plurality of handling flanges 110 are formed on an exterior surface of the sleeve 102. In a typical embodiment, the sleeve 102 is constructed of high-strength material such as, for example, 75KSI steel.

A shaft 104 is disposed within the sleeve 102 in a coaxial fashion relative to the sleeve 102. A plurality of friction pins 112 extend from the shaft 104 in a radial configuration. A portion of the shaft 104 extends below the guide cone 106 and forms an insertion guide 103. The insertion guide 103 aids in centering the friction-pin unit 100 over a pipe 118. In a typical embodiment, the shaft 104 is approximately 8⅜ inches in diameter; however, any size of the shaft 104 may be utilized as dictated by design requirements. In a typical embodiment, the shaft 104 is constructed of a high-strength material such as, for example, 75KSI steel; however, any appropriate high-strength material may be utilized. In a typical embodiment, the pipe 118 is, for example, a damaged sub-sea riser pipe.

A valve 105 is disposed at a top end 122 of the sleeve 102. In a typical embodiment, the valve 105 is fluidly coupled to an interior region bounded by the interior surface of the sleeve 102. The valve 105 allows passage of fluid and relief of pressure from the interior region to an exterior environment. Relief of pressure reduces a downward force required to install the friction-pin unit 100 on the pipe 118. In a typical embodiment, the valve 105 is a full-bore ball valve; however, in various other embodiments, valve designs such as, for example, a gate valve, may be utilized.

Figure 2:
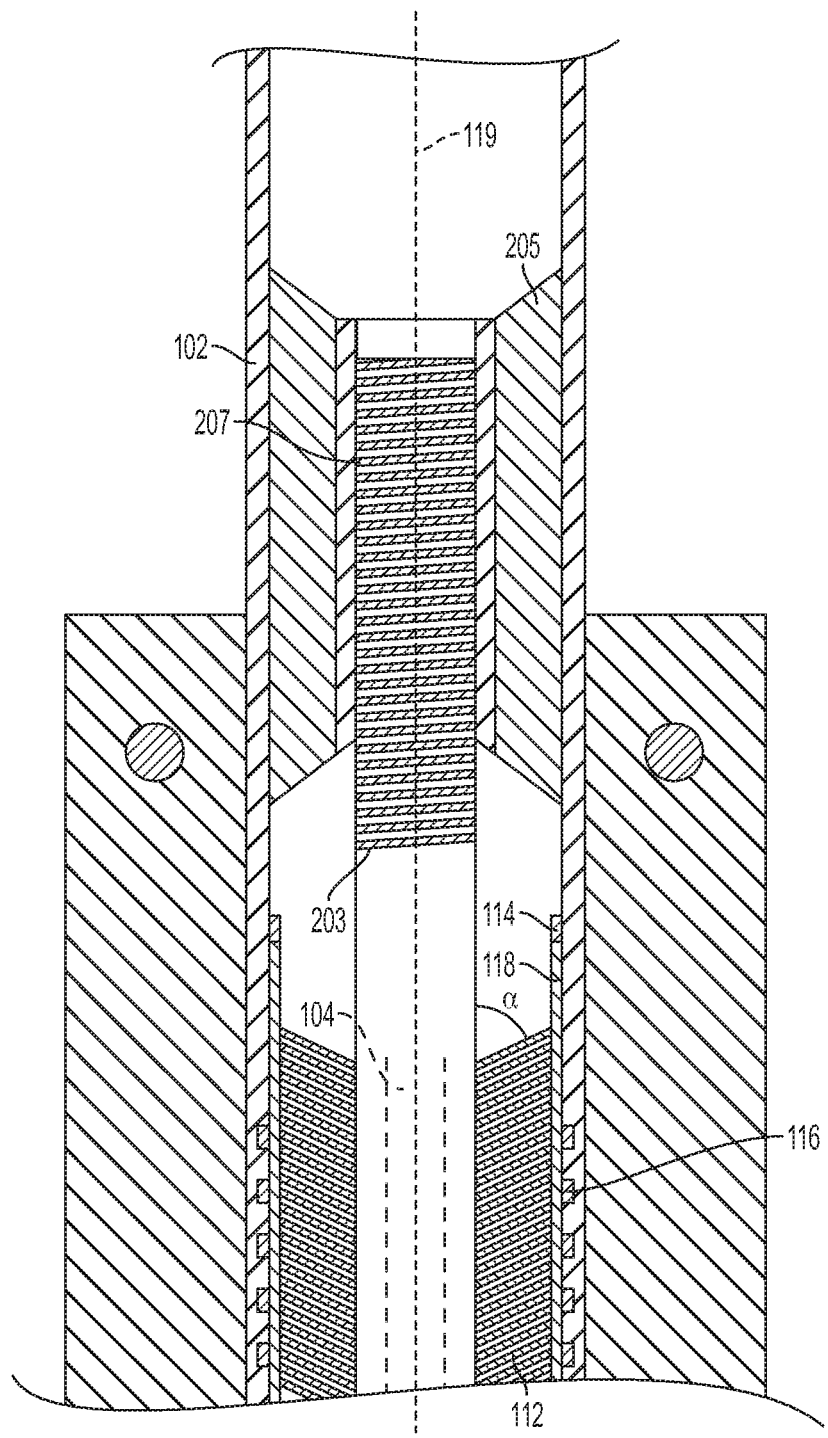
FIG. 2 is an enlarged cross-sectional view of Detail A of the friction-pin unit of FIG. 1.

FIG. 2 is an enlarged cross-sectional view of Detail A of the friction-pin unit 100. Threads 203 formed on an exterior surface of an upper end of the shaft 104 engage a threaded sleeve 207 disposed within the sleeve 102. The threaded sleeve 207 is fixed within the sleeve 102 by a plurality of flanges 205. In a typical embodiment, each flange of the plurality of flanges 205 is a vertically-oriented web that extends inwardly from the interior surface of the sleeve 102 toward the threaded sleeve 207. Channels (not explicitly shown) are formed between adjacent flanges of the plurality of flanges 205. Fluid present within the sleeve 102 is able to pass through the channels. Thus, the plurality of flanges 205 do not restrict movement of fluids within the sleeve 102.

The plurality of friction pins 112 are secured to, and extend outwardly from, the shaft 104 in a radial fashion. In a typical embodiment, the friction pins 112 are attached to the shaft 104 via a thermal or mechanical press-fit engagement. For example, in the case of a thermal press-fit engagement, the plurality of friction pins 112 are inserted into a plurality of thermally expanded holes (not shown) in the shaft 104. Upon cooling of the shaft 104, the plurality of holes contracts and forms an interference engagement with the plurality of friction pins 112. The plurality of friction pins 112 may be of any size or arrangement as dictated by design requirements. A length and a cross-sectional shape of the plurality of friction pins 112 varies with the diameter of the pipe 118 and with design requirements. For example, if the pipe 118 has a diameter of approximately 10 inches, the plurality of friction pins 112 may have a diameter of approximately ⅜", a length of approximately 6" and are disposed at an angle ($\alpha$) of approximately 34.5 degrees from the vertical axis 119 of the friction-pin unit 100.

In an illustrative embodiment, the friction pins 112 are arranged in six columns of approximately 220 pins; however, any number of columns and any number of friction pins may be utilized. For example, friction pin units utilizing principles of the invention may include an integer number of the friction pins 112 between 1 and approximately 100,000. Likewise, friction pin units utilizing principles of the invention may be arranged in an integer number of columns of the friction pins 112 between 1 and approximately 100. In other embodiments, different arrangements of the friction pins 112 may be employed, such as, for example, a staggered arrangement, a spiral arrangement, or a concentric-circle arrangement. In a typical embodiment, the plurality of friction pins 112 are constructed of a high-strength material such as, for example, 75KSI steel; however, in other embodiments, other high-strength materials may be utilized. The stop ring 114 is circumferentially disposed about the interior surface of the sleeve 102. In a typical embodiment, the stop ring 114 engages a top aspect of the pipe 118 and prevents further downward movement of the friction-pin unit 100 along the vertical axis 119. The at least one ring seal 116 is circumferentially disposed about the interior surface of the sleeve 102. During operation, the at least one ring seal 116 circumferentially engages an outer surface of the pipe 118 and forms a seal between the pipe 118 and the sleeve 102 so as to impede leakage of fluids from the sleeve 102 into the exterior environment.

Figure 3:
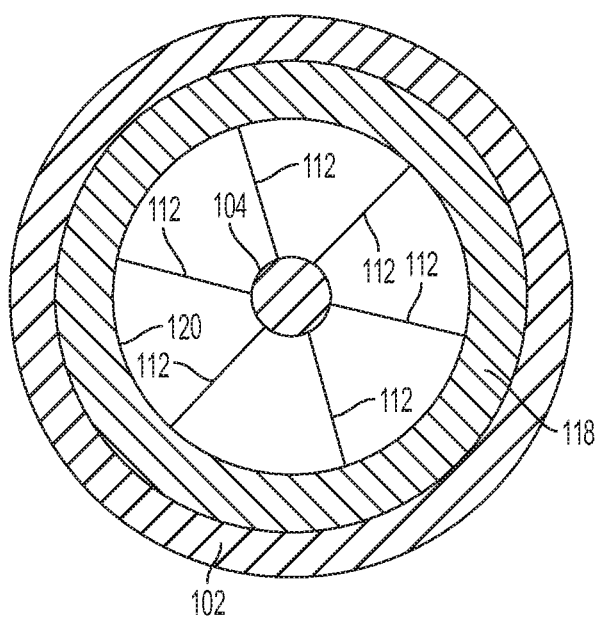
FIG. 3 is a cross-sectional view, about line B-B, of the friction-pin unit of FIG. 1.

FIG. 3 is a cross-sectional view, about line B-B, of the friction-pin unit 100. During operation, the sleeve 102 is placed around an exposed end of the pipe 118. The shaft 104 and the plurality of friction pins 112 extend into an interior space of the pipe 118. An inner surface 120 of the pipe 118 causes the plurality of friction pins 112 to flex in a direction towards the top end 122 of the sleeve 102. Flexing of the plurality of friction pins 112 results in the plurality of friction pins 112 being spring-biased towards the inner surface 120. The plurality of friction pins 112 engage an inner surface 120 of the pipe 118 and create an interference fit between the friction-pin unit 100 and the inner surface 120. For example, if the pipe 118 has a diameter of approximately 10 inches, the plurality of friction pins 112 flex by approximately 0.5 degrees to approximately 2.0 degrees; however, the degree of flexion of the plurality of friction pins 112 varies depending on the diameter of the pipe 118 and design requirements. The interference fit secures the friction-pin unit 100 in place relative to the pipe 118 and prevents the friction-pin unit 100 from becoming disengaged from the pipe 118. In a typical embodiment, the friction-pin unit 100 resists, for example, approximately 5,000 psi (1475 kips) of fluid-head pressure within the pipe 118. In other embodiments, the shaft 104 may include a plurality of shaft segments (not shown). In such an embodiment, additional shaft segments may be added to increase a length of the shaft 104 and increase pressure capacity of the friction-pin unit 100.

Figure 4:
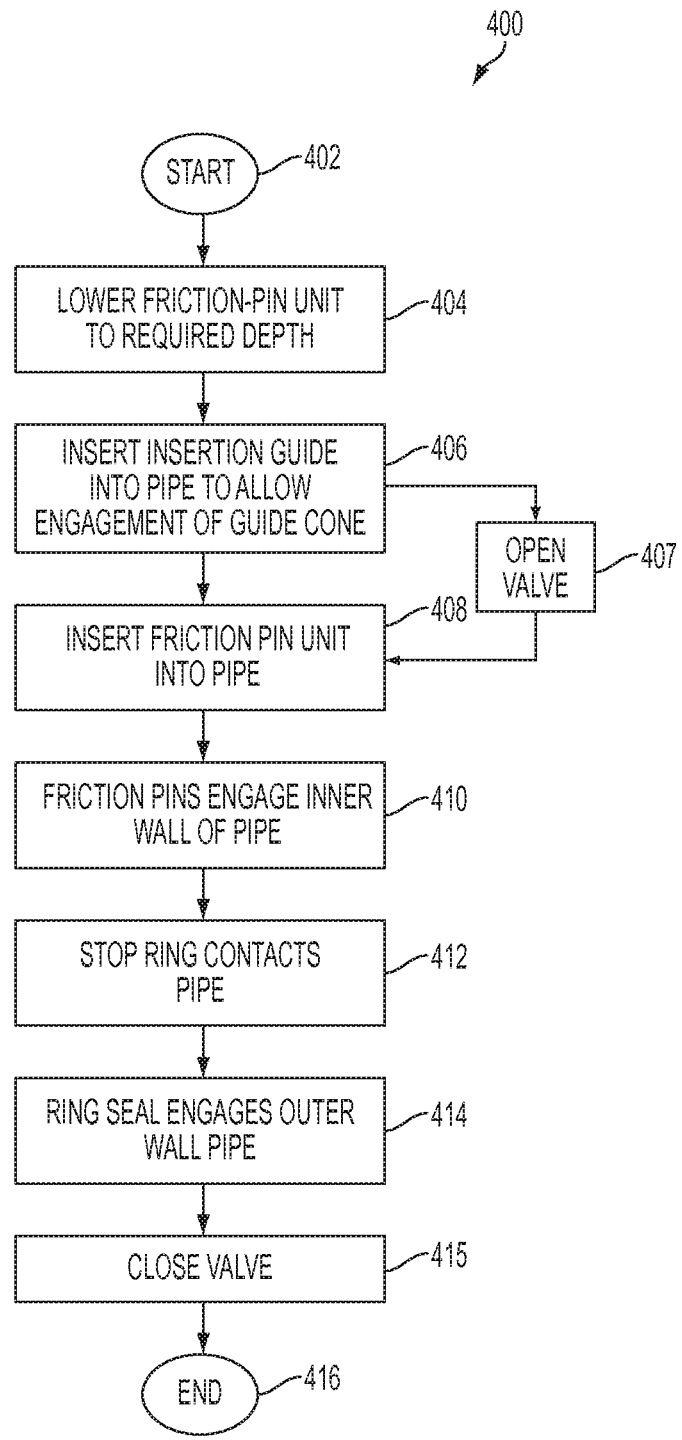
FIG. 4 is a flow diagram of a process for sealing a pipe.

FIG. 4 is a flow diagram of a process for sealing a pipe. A process 400 starts at step 402. At step 404, the friction-pin unit 100 is lowered via, for example, a drill string from a water surface. At step 406, the insertion guide 103 is inserted into an exposed end of the pipe 118. In a typical embodiment, the pipe 118 is, for example, a damaged riser pipe. The guide cone 106 causes the friction-pin unit 100 to self-center above the pipe 118. At step 407, the valve 105 is placed in an open position. At step 408, a downward force sufficient to overcome fluid and mechanical resistance is applied to the friction-pin unit 100. The downward force causes the friction-pin unit 100 to be lowered such that the sleeve 102 envelops the pipe 118 and the shaft 104 extends further into an interior space of the pipe 118. The valve 105, when in an open position, serves to lessen pressure build-up within the friction-pin unit 100 and reduces a required magnitude of the downward force.

At step 410, the plurality of friction pins 112 engage the inner surface 120 of the pipe 118 and create an interference fit between the friction-pin unit 100 and the inner surface 120. At step 412, the stop ring 114 contacts a top of the pipe and prevents further downward movement of the friction-pin unit 100 relative to the pipe 118. At step 414, the at least one ring seal 116 circumferentially engages the outer surface of the pipe 118 and create a seal between the sleeve 102 and the pipe 118 that impedes leakage of fluids into the exterior environment. At step 415, the valve 105 is closed so as to impede leakage of fluids into the exterior environment. In a typical embodiment, the valve 105 is closed, for example, by a remote-operated vehicle. The process 400 ends at step 416. One skilled in the art will appreciate that, in various other embodiments, one or more of the above-listed steps may be performed simultaneously in whole or in part or in a different order from that described above.

Figure 5:
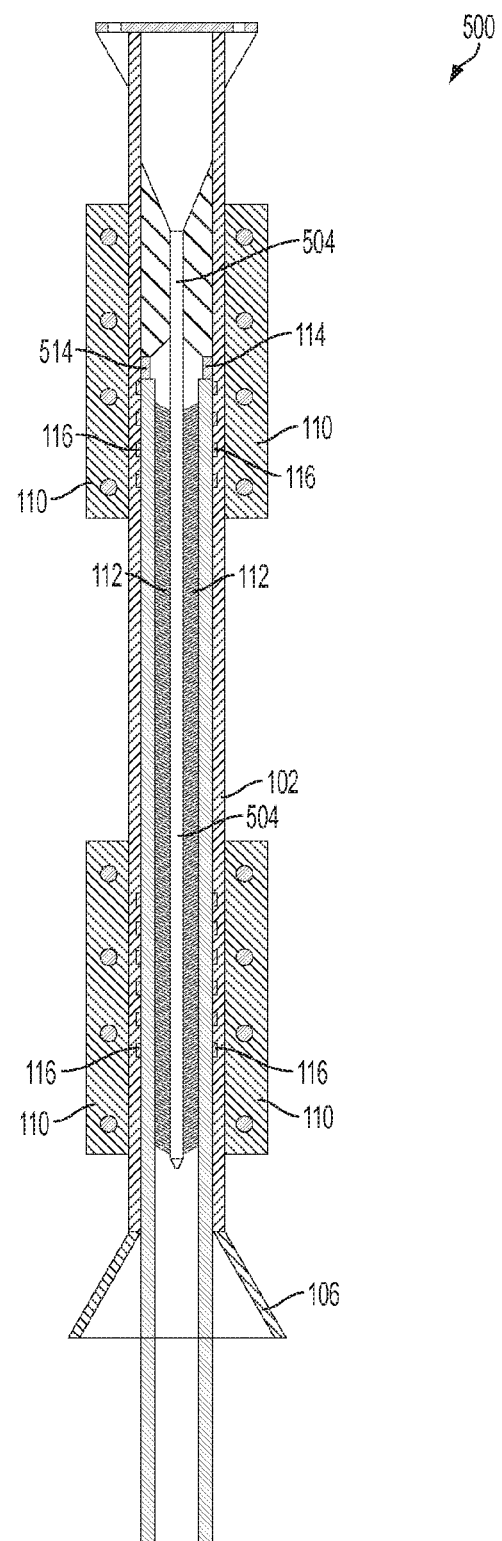
FIG. 5 is a side cross-sectional view of a friction-pin unit without a valve.

FIG. 5 is a side cross-sectional view of a friction-pin unit 500. The friction-pin unit 500 includes the sleeve 102. The guide cone 106 is formed on a bottom aspect of the sleeve 102. The stop ring 114 and the at least one ring seal 116 are disposed circumferentially about an interior surface of the sleeve 102. The shaft 504 is disposed in the sleeve 102 in a coaxial fashion. The plurality of friction pins 112 extend from the shaft 504 in a radial configuration. Thus, the friction-pin unit 500 is similar in construction to the friction-pin unit 100 (shown in FIG. 1); however the friction-pin unit 500 omits the valve 105 and the insertion guide 103 shown in FIG. 1.

Figure 6:
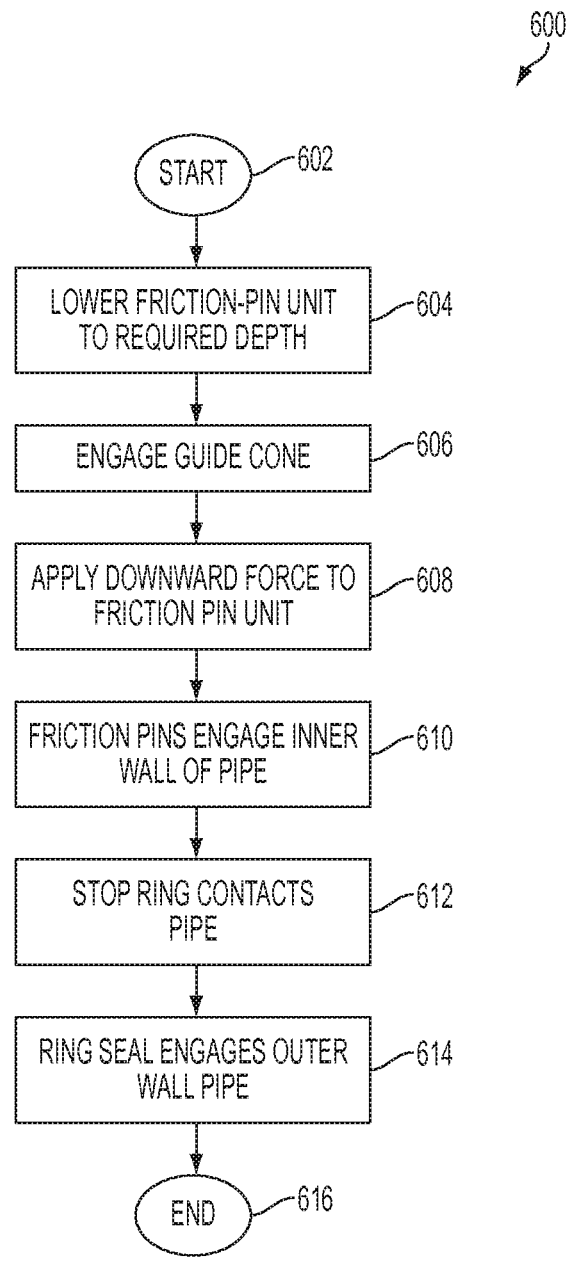
FIG. 6 is a flow diagram of a process for sealing a pipe.

FIG. 6 is a flow diagram of a process for sealing a pipe. A process 600 starts at step 602. At step 604, the friction-pin unit 500 is lowered into position via the plurality of handling flanges 110. At step 606, an exposed end of the pipe 118 is engaged by the guide cone 106. The guide cone 106 causes the friction-pin unit 500 to self-center above the pipe 118. At step 608, a downward force sufficient to overcome fluid and mechanical resistance is applied to the friction-pin unit 500. The downward force causes the friction-pin unit 500 to move in a downward direction relative to the pipe 118 such that the sleeve 102 envelops the pipe 118 and the shaft 504 extends into an interior of the pipe 118.

At step 610, the plurality of friction pins 112 engage an inner surface 120 of the pipe 118 and create an interference fit between the friction-pin unit 500 and the inner surface 120. At step 612, the stop ring 114 contacts a top region of the pipe 118. The stop ring 114 prevents further downward movement of the friction-pin unit 500 relative to the pipe 118. At step 614, the at least one ring seal 116 circumferentially engages the outer surface of the pipe 118 and forms a seal between the sleeve 102 and the pipe 118 so as to impede leakage of fluids into the exterior environment. The process 600 ends at step 616. One skilled in the art will appreciate that, in various other embodiments, one or more of the above-listed steps may be performed simultaneously in whole or in part or in a different order from that described above.

Figure 7A:
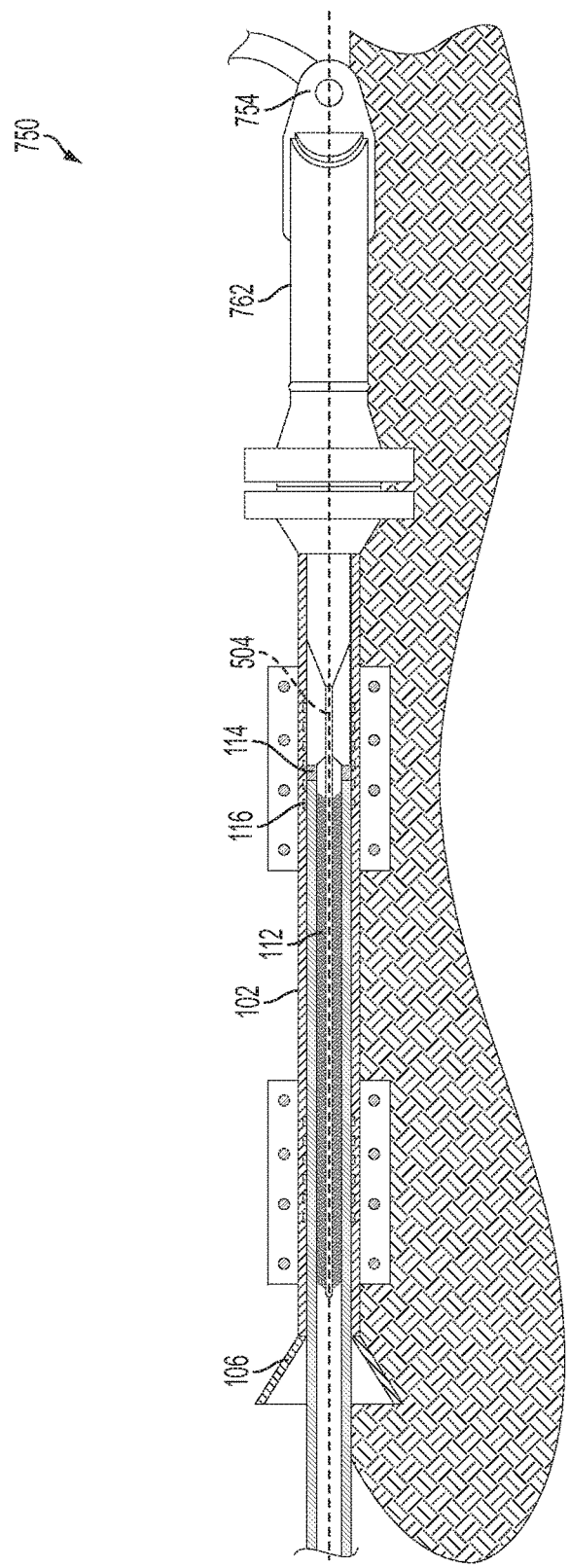
FIG. 7A is a schematic diagram of a friction-pin unit.

FIG. 7A is a schematic diagram of a friction-pin unit 750. The friction-pin unit 750 includes the sleeve 102. The guide cone 106 is formed on a bottom aspect of the sleeve 102. The stop ring 114 and the at least one ring seal 116 are disposed circumferentially about an interior surface of the sleeve 102. The shaft 504 is disposed in the sleeve 102 in a coaxial fashion. The plurality of friction pins 112 extend from the shaft 504 in a radial configuration. Thus, the friction-pin unit is similar in construction to the friction-pin unit 500 discussed above with respect to FIG. 5. A recovery head 752 having a recovery eye 754 is attached to a top aspect of the friction-pin unit 750. In a typical embodiment, the recovery eye 754 facilitates manipulation, handling, and recovery of a pipe.

Figure 7B:
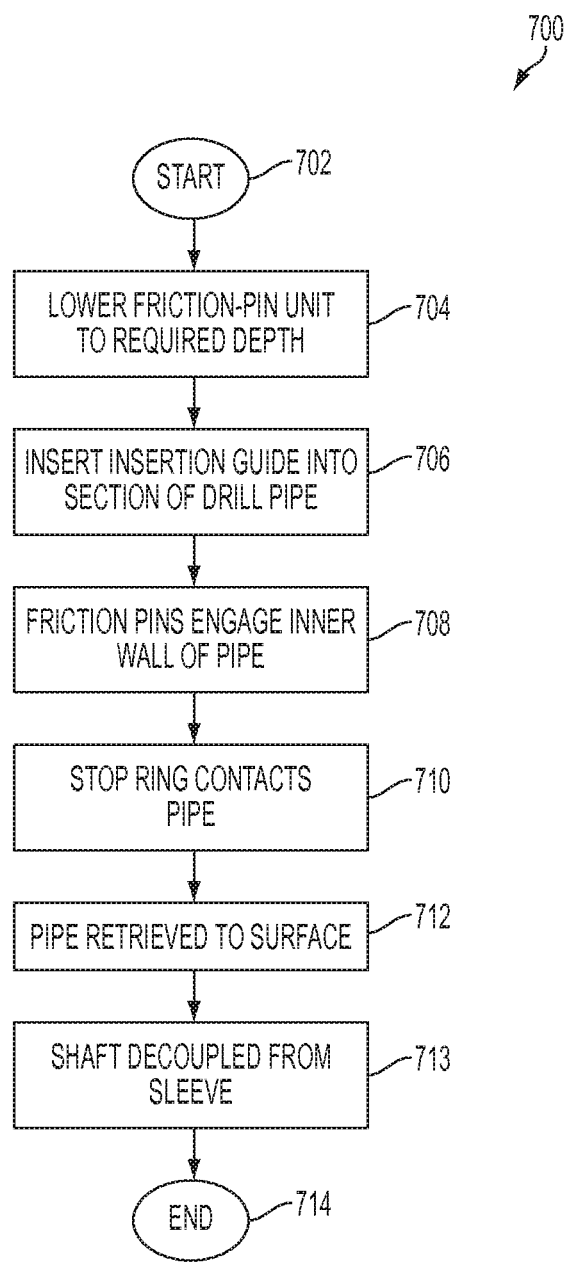
FIG. 7B is a flow diagram for handling a pipe.

FIG. 7B is a flow diagram for handling a pipe. In a typical embodiment, the pipe may be a damaged riser pipe, such as, for example, the pipe 118. In other embodiments, the pipe 118 may be components of, for example, an abandoned or damaged pipeline or flowline. A process 700 begins at step 702. At step 704, a friction-pin unit such as, for example, the friction-pin unit 750, is lowered to a required depth via, for example, a crane or a drill string. At step 706, the shaft 504 is inserted into the pipe. At step 708, the plurality of friction pins 112 engage an inner surface of the pipe and create an interference fit between the friction-pin unit 750 and the inner surface of the pipe. At step 710, the stop ring 114 contacts the pipe. The stop ring 114 prevents further movement of the friction-pin unit 750 relative to the pipe. At step 712, the pipe is handled in a desired manner. For example, the pipe may be retrieved to an ocean surface via, for example, a crane. At step 713, the shaft 504 is decoupled from the sleeve 102. In a typical embodiment, the shaft 504 is decoupled from the sleeve 102 via disengagement of the threads 203 from the threaded sleeve 207. Decoupling of the shaft 504 from the sleeve 102 allows the sleeve 102 to be removed from the pipe and facilitates removal of the shaft 504 from the pipe.

In a typical embodiment, the shaft 504 is removed from the pipe via a tool such as, for example, a ram or press. The process 700 ends at step 714. One skilled in the art will appreciate that, in various other embodiments, one or more of the above-listed steps may be performed simultaneously in whole or in part or in a different order from that described above. While the process 700 has been described above with respect to the friction-pin unit 750, one skilled in the art will recognize that, in other embodiments, the process 700 may utilize other friction-pin units utilizing principles of the invention, such as, for example, the friction-pin unit 500 or the friction-pin unit 100.

FIGS. 8A-8B are schematic diagrams of a pipe fluid-displacement system 800. The pipe fluid-displacement system 800 includes a friction-pin unit 802 fluidly coupled to a displacement-agent source 804 via a fluid conduit 806. In a typical embodiment, the friction-pin unit 802 is similar in construction to, for example, the friction-pin unit 100 (shown in FIG. 1). A recovery head 808 is fluidly coupled to the friction-pin unit 802. The recovery head 808 includes a valve 809 and a recovery eye 811. The valve 809 is fluidly coupled to the displacement-agent source 804 via the fluid conduit 806. By way of example, FIGS. 8A-8B illustrate the friction-pin unit 802 as including three valves 809; however, one skilled in the art will recognize that, in other embodiments, friction-pin units utilizing principles of the invention may include any number of valves. In a typical embodiment, the displacement-agent source 804 is, for example a volume of compressed gas; however, in other embodiments, other fluids, including, for example, liquid or gel agents, could be utilized. In a typical embodiment, the recovery eye 811 is coupled to, for example a lift or a crane, to facilitate manipulation of the friction-pin unit 802.

During operation, the friction-pin unit 802 is lowered to an appropriate depth to engage a pipe 810. In a typical embodiment, the pipe 810 is a component of, for example, a sub-sea pipeline or flowline; however, in other embodiments, any kind of pipe could be utilized. As shown in FIG. 8A, the friction-pin unit 802 engages a free end of the pipe 810 and forms an interference engagement with the pipe 810 as described above. A displacement agent is supplied by the displacement-agent source 804 to the friction-pin unit 802 via the fluid conduit 806. In a typical embodiment, the displacement agent may be, for example, nitrogen, helium, ambient air, or other appropriate gas as dictated by design requirements. In other embodiments, the displacement agent may be, for example, a liquid or gel agent. As shown in FIG. 8B, the displacement agent displaces fluid such as, for example, water, oil, or other petroleum products that are present within the pipe 810. In a typical embodiment, the displacement agent displaces fluid away from the friction-pin unit 802 to a point where the pipe 810 can be sealed. In a typical embodiment, the displacement agent is lighter than the displaced fluid thus facilitating lifting and manipulation of the pipe 810.

Figure 9:
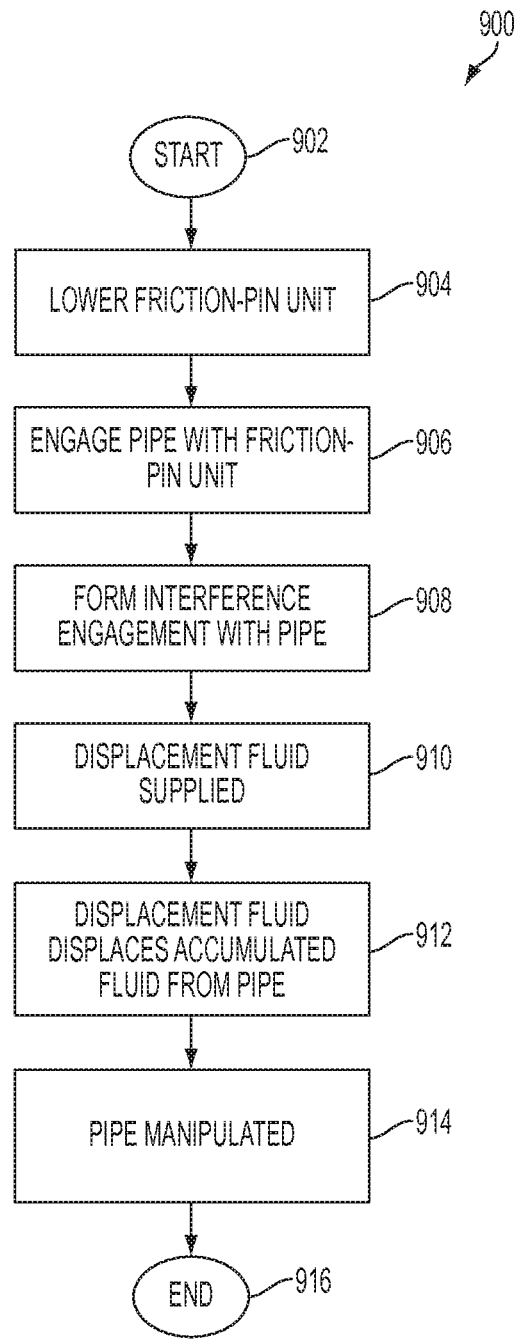
FIG. 9 is a flow diagram of a process for dewatering a pipe.

FIG. 9 is a flow diagram of a process 900 for displacing fluid from the pipe 810. The process starts at step 902. At step 904, the friction-pin unit is lowered to an appropriate depth to engage the pipe 810. At step 906, the friction-pin unit 802 engages a free end of the pipe 810. At step 908, the friction-pin unit forms an interference engagement with the pipe 810. At step 910, displacement agent is supplied by the displacement-agent source 804 to the friction-pin unit 802 via the fluid conduit 806. At step 912, the displacement agent displaces fluids present in the pipe 810. At step 914, the pipe 810 is manipulated in a desired manner utilizing the recovery eye 811. The process 900 ends at step 916.

Figure 10A:
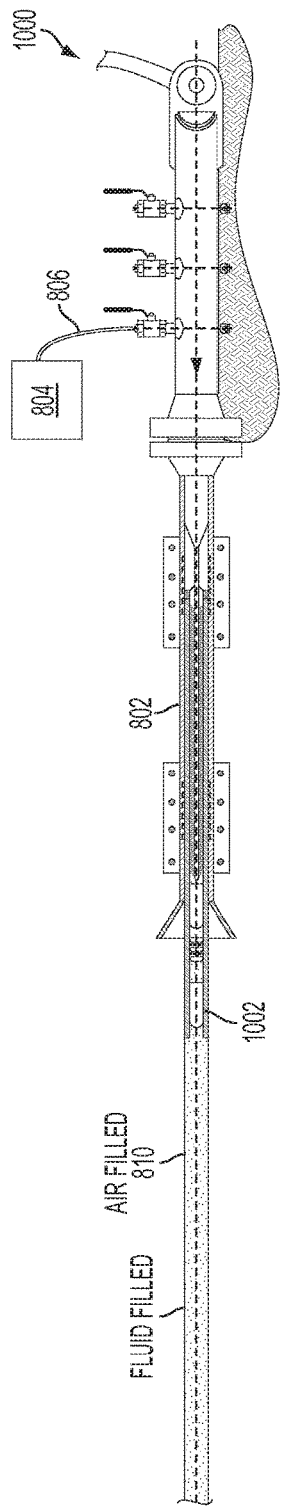
FIG. 10A-10C is a schematic diagram of a pipe fluid-displacement system utilizing a pig device.
Figure 10B:
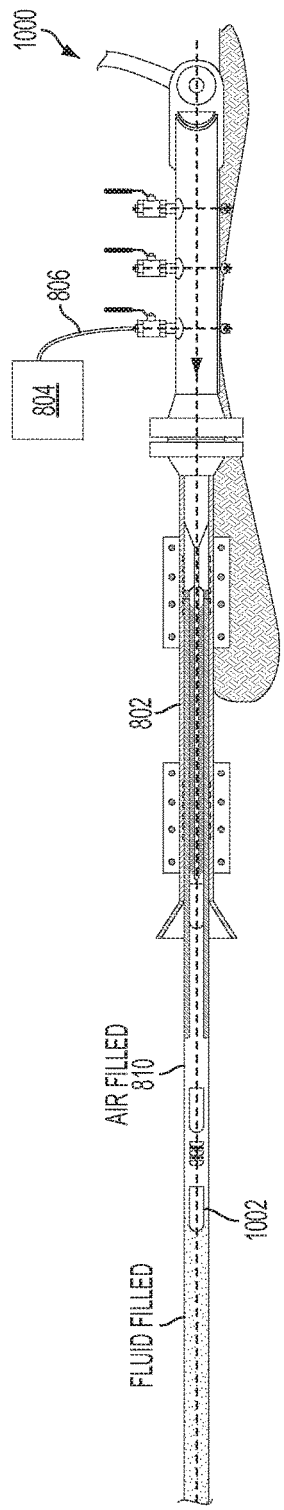
Figure 10C:
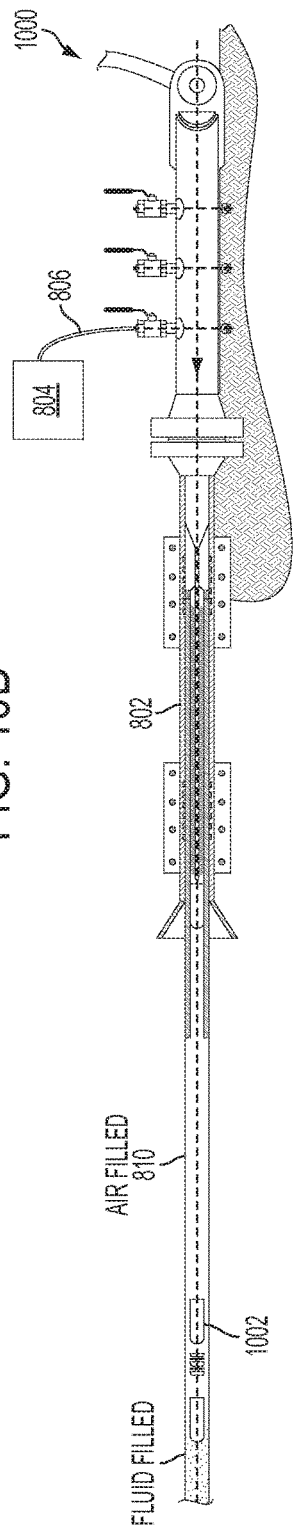

FIGS. 10A-10C are schematic diagrams of a pipe fluid-displacement system 1000 utilizing a pig device 1002. The pipe fluid-displacement system 1000 includes the friction pin unit 802, the displacement-agent source 804, and the fluid conduit 806. The pig device 1002 is disposed on a distal end of the friction-pin unit 802. In a typical embodiment, the pig device 1002 is constructed from a lightweight, solid material such as, for example, any appropriate plastic such as, for example, polypropylene or polyurethane; however, in other embodiments, the pig device 1002 may be constructed from other types of materials such as, for example, a gel or a foam material. In a typical embodiment, the pig device 1002 has an outer diameter slightly less than an inner diameter of the pipe 810.

During operation, upon engagement of the friction-pin unit 802 with the pipe 810, the pig device 1002 is disposed within the pipe 810. Displacement agent is supplied by the displacement-agent source 804 to the friction-pin unit 802 via the fluid conduit 806. The displacement agent causes a head pressure to build behind the pig device 1002. As shown in FIG. 10B, when the pressure head increases to a magnitude greater than a fluid pressure within the pipe 810, the pig device 1002 traverses a length of the pipe 810. As shown in FIG. 10C, the pig device 1002 displaces any water, oil, or other accumulated fluids from the pipe 810. In a typical embodiment, the pig device 1002 displaces fluid away from the friction-pin unit 802 to a point where the pipe 810 can be sealed.

Figure 11:
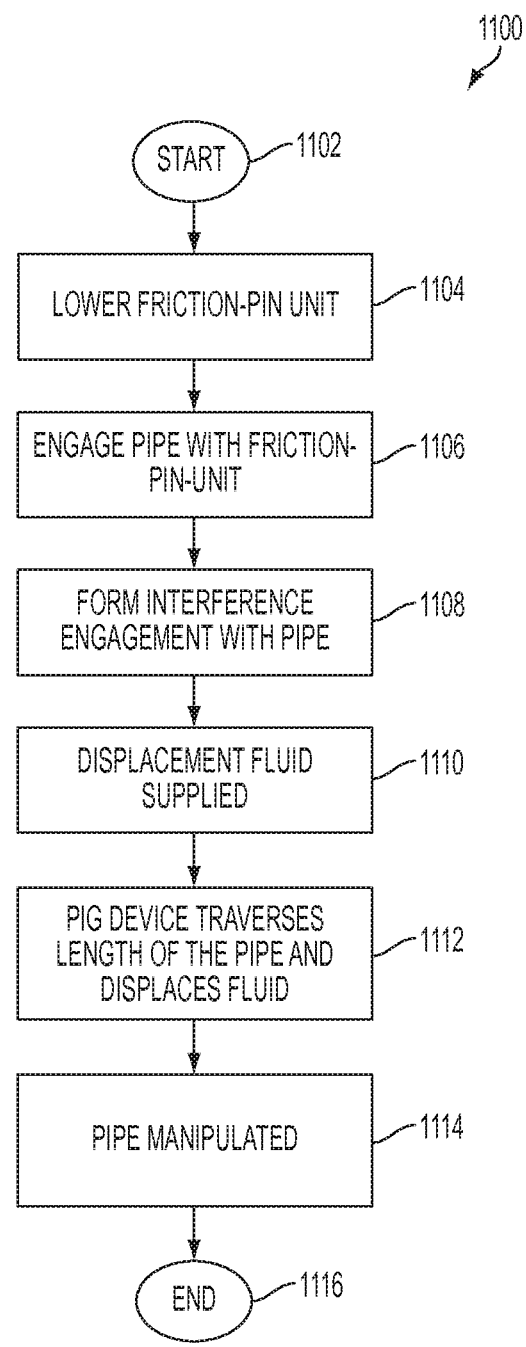
FIG. 11 is a flow diagram of a process for dewatering a pipe utilizing a pig device.

FIG. 11 is a flow diagram of a process 1100 for displacing fluid from the pipe 810 utilizing a pig device. The process starts at step 1102. At step 1104, the friction-pin unit 802 is lowered to an appropriate depth to engage the pipe 810. At step 1106, the friction-pin unit 802 engages a free end of the pipe 810. At step 1108, the friction-pin unit forms an interference engagement with the pipe 810. At step 1110, displacement agent is supplied by the displacement-agent source 804 to the friction-pin unit 802 via the fluid conduit 806. At step 1112, the pig device 1002 traverses a length of the pipe 810 and displaces fluid from the pipe 810. At step 1114, the pipe 810 is manipulated in a desired manner. The process 1100 ends at step 916.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. A system for displaying fluid from a pipe, the system comprising:
   a displacement-agent source containing a displacement agent;
   a friction-pin unit operatively coupled, via a conduit, to the displacement-agent source to allow transmission of the displacement agent from the displacement-agent source to the friction-pin unit, the friction-pin unit comprising:
   a sleeve;
   a guide cone formed at a first end of the sleeve;
   a shaft disposed coaxially within the sleeve; and
   a plurality of friction pins extending radially outward from the shaft, the plurality of friction pins being angulated relative to the shaft.

2. The system of claim 1, comprising a pig device disposed at a distal end of the shaft.

3. The system of claim 2, wherein the pig device comprises at least one of polypropylene and polyurethane.

4. The system of claim 2, wherein the pig device comprises at least one of a foam or a gel.

5. The system of claim 1, wherein the conduit is fluidly coupled to the friction-pin unit via a valve.

6. The system of claim 1, wherein the friction-pin unit allows manipulation and retrieval of a pipe having a fluid disposed therein.

7. The system of claim 6, wherein the displacement agent is lighter than the fluid and substantially removes the fluid from the pipe.

8. The system of claim 1, wherein the displacement agent comprises at least one of a gas, a liquid, and a gel.

* * * * *